(No Model.)
F. H. RICHARDS.
GEARED BICYCLE.
No. 562,662. Patented June 23, 1896.
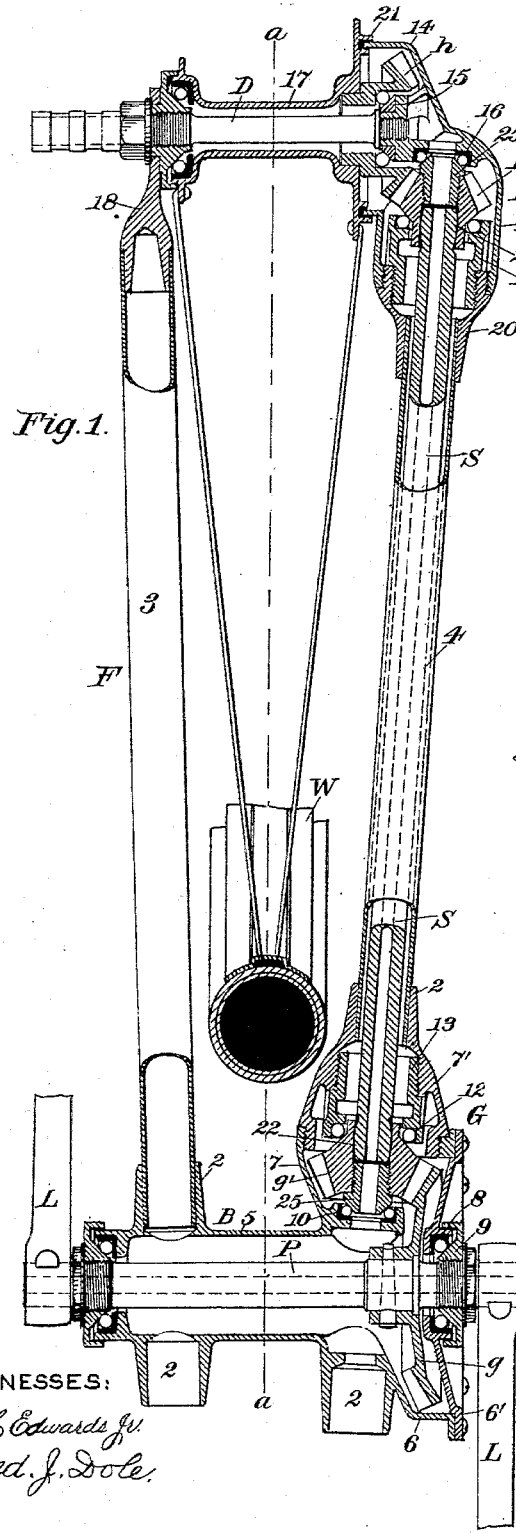
Fig. 1.
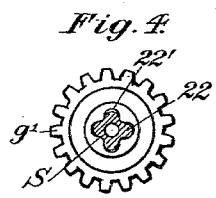
Fig. 3.
Fig. 4.
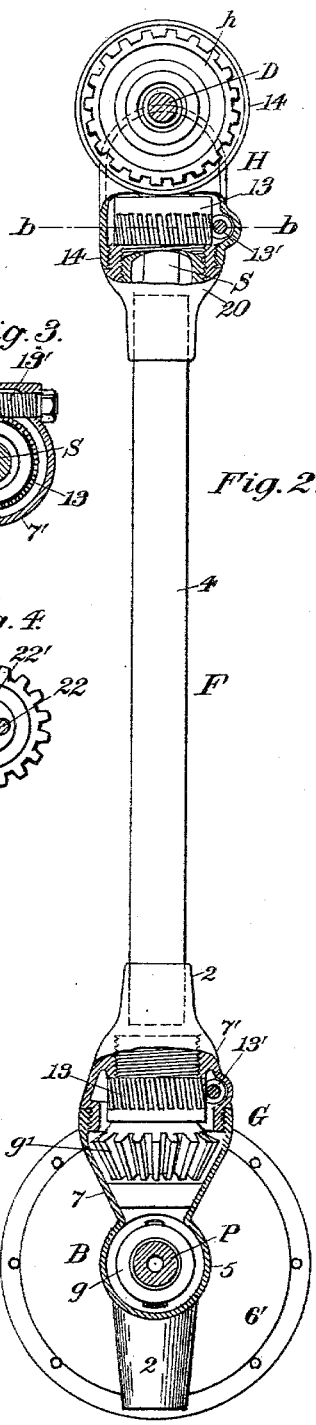
Fig. 2.
WITNESSES:
J. L. Edwards Jr.
Fred. J. Dole.
INVENTOR:
F. H. Richards ary to revolubly connect the driving-wheel and pedal-shaft by means of gear-wheels fixed one to each end of the side shaft and meshing one with a gear-wheel carried by the pedal-shaft and the other with a gear-wheel carried by the driving-wheel, and much difficulty has been experienced in consequence of accidental distortion and misalinement of the side shaft generally caused by the springing or bending of the slightly-elastic bicycle-frame, which action cramps or disarranges the gears, thus throwing them out of true working position and destroying the effective operation thereof.
UNITED STATES PATENT OFFICE.

FRANCIS H. RICHARDS, OF HARTFORD, CONNECTICUT.

GEARED BICYCLE.

SPECIFICATION forming part of Letters Patent No. 562,662, dated June 23, 1896.

Application filed June 20, 1894. Serial No. 515,089. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Geared Bicycles, of which the following is a specification.

This invention relates to geared bicycles of that class in which the driving-wheel is driven from the pedal-shaft through the medium of gearing and a connecting side shaft. In this class of geared bicycles as heretofore made, it has been customary to revolubly connect the driving-wheel and pedal-shaft by means of gear-wheels fixed one to each end of the side shaft and meshing one with a gear-wheel carried by the pedal-shaft and the other with a gear-wheel carried by the driving-wheel, and much difficulty has been experienced in consequence of accidental distortion and misalinement of the side shaft generally caused by the springing or bending of the slightly-elastic bicycle-frame, which action cramps or disarranges the gears, thus throwing them out of true working position and destroying the effective operation thereof.

It is one of the objects of my present invention to provide, in connection with the pedal-shaft and driving-wheel of a bicycle, a driving mechanism in which each set of gears which revolubly connect the pedal-shaft and driving-wheel, respectively, with the side shaft, will have fixed bearings entirely independent of the side shaft and will maintain a fixed operative relation irrespective of any misalinement of the side shaft, and thereby obviate the difficulties experienced in geared bicycles of this class.

Another object of my present invention is to provide, in connection with the gears adjacent to the driving-wheel, and the gears adjacent to the pedal-shaft, a flexible or non-rigid driving connection capable of rotating one set of gears from the other, and adapted to have a lateral and a longitudinal movement to thereby cause the same to automatically adjust itself to any changes that may occur in the relative position of said gears.

In the drawings accompanying and forming part of this specification, Figure 1 is a sectional plan view of a portion of a bicycle embodying my invention. Fig. 2 is a longitudinal section of the same, taken in line $a\,a$, Fig. 1, looking toward the right hand in said figure, the wheel and wheel-hub being removed, a portion of the gear-casing adjacent to the pedal-shaft and driving-wheel being broken away. Fig. 3 is a cross-section taken in line $b\,b$, Fig. 2, looking downward in said figure and showing one of the roller-bearings and its adjusting device. Fig. 4 is a cross-section of the side shaft, showing its connection with one of the driving-gears.

Similar characters designate like parts in all of the figures.

In the drawings I have shown only so much of the framework of a bicycle as is necessary to fully illustrate the application of my improvements thereto.

The parts of the bicycle as herein shown consist of the framework, (designated in a general way by F,) the driving-wheel carrier D, which constitutes the principal part of, and will be herein referred to as, the "rear bracket;" the driving-wheel carried by said bracket B, the main or pedal-shaft-carrying bracket B, the side tubes 3 and 4, connecting the main bracket B and the driving-wheel-carrying bracket D, the pedal-shaft P, having the usual pedal-levers L, the intermediate or side shaft S, contained within one of the side tubes, a set of driving-gears, (designated in a general way by G,) connecting the side shaft with the pedal-shaft, and a second set of gears, (designated in a general way by H,) connecting the side shaft and driving-wheel. These two sets of gears G and H will each be herein referred to, as a whole, as the "pedal-shaft gearing" and the "driving-wheel gearing," respectively, each set being incased by a dust-proof casing, as will be hereinafter described.

The two brackets B and D, respectively, will, in practice, be of relatively rigid construction, whereas the side tubes 3 and 4, which connect the two brackets, will preferably be relatively flexible, so as to yield slightly when subjected to the usual strains inherent to bicycles.

In the preferred form of geared bicycle herein shown and described the main bracket B has a tubular body portion 5, and is constructed to form the main part or base of the pedal-gearing case, it having one end thereof flared or enlarged, as shown at 6, to receive the pedal-shaft gear $g$, and having a lateral extension 7, preferably cup-shaped, and preferably formed integral therewith and adapted to receive the side-shaft gear $g'$, which meshes with said pedal-shaft gear $g$. Each of these parts 6 and 7 are provided with caps 6' and 7', respectively, the one, 7', of which is preferably cup-shaped, is fixed to the end of the side tube 4, and is screwed into the outer open end of the part 7, while the one, 6', is in the nature of an axially-recessed disk and is removably secured to the outer open end of the part 6 of said casing preferably by means of screws. This cap 6' forms a bearing for one end of the pedal-shaft P, said cap being annularly flanged at its inner edge to form one member, 8, of a ball-bearing for the pedal-shaft, the other member, 9, of the ball-bearing being formed by a conically-faced nut adjustably secured to this end of pedal-shaft P, balls being interposed between these two members in the usual manner. The opposite end of the pedal-shaft is supported in a like manner by a ball-bearing, one member of which is formed by an internal flange upon the tubular portion of the bracket B, and the other member of which is formed by a conically-faced nut adjustably secured to this end of the pedal-shaft.

By reference to Fig. 1 of the drawings, it will be seen that the bearing for the pedal-shaft is located outside the pedal-gear $g$. This pedal-shaft gear $g$ is fixed to the pedal-shaft within the part 6 of the casing and is in the nature of a bevel-gear, the teeth of which mesh with a side-shaft bevel-gear of smaller diameter supported at opposite ends for rotation in ball-bearings 10 and 12 in the casing, the bearing 10 being a fixture with the part 7 of said casing, and the bearing 12 being a fixture with the cap or other part, 7', of the casing.

As a means for taking up wear in the ball-bearings 10 and 12, the balls will usually be carried between a conical track upon the gear $g'$ and a track formed at the end of a collar or sleeve 13, having a screw-threaded shank screwed into a screw-threaded portion of the interior of the cap or member 7' of the casing, said sleeve being in the nature of a worm-wheel, it having peripheral teeth in engagement with a worm 13', journaled in bearings formed in the cap 7', as most clearly shown in Figs. 2 and 3, said worm extending to the outside of the casing and being adapted to be turned to adjust the bearing 12 with relation to the bearing 10. By this construction and organization it will be seen that the side-shaft gear $g'$ is supported against lateral movement by fixed bearings in the casing independent of the side shaft S, connected therewith, and that any misalinement of the side shaft will in no wise affect the working position of the gear $g'$ relatively to the gear $g$.

The casing for the driving-wheel gearing H consists of a somewhat L-shaped recessed part or member 14, having two oppositely-disposed ball-bearing tracks 15 and 16, the one, 15, of which is adapted for supporting the driving-wheel gear $h$, which is fixed to the hub 17 of the driving-wheel W, said hub being supported at its opposite end by a ball-bearing, one member of which is formed by a flange upon said hub, and the other member of which is formed by a conical-faced nut adjustably secured to the end of the driving-wheel carrier or bracket D, while the bearing 16 is adapted for supporting one end of the side-shaft gear $h'$, which meshes with the driving-wheel gear $h$, the opposite end of said side-shaft gear being supported by a ball-bearing carried by a cap 20, fixed to the end of the tube 4 adjacent to the driving-wheel and screwed into the part 14 of the driving-wheel-gearing case, in a similar manner substantially the same as that described in connection with the side-shaft gear $g'$ and its casing. The part 14 of the driving-wheel-gearing case is fixedly secured to the framework by means of the driving-wheel carrier, which is in the nature of a stay-rod D, extending through the end of the head 18 of the tube 3 and screwed into said part 14, as clearly shown in Fig. 1 of the drawings.

As a means for excluding dust in the open inner end of the part 14 of the driving-wheel-gearing case, the hub 17 of the driving-wheel is shown annularly flanged at one side thereof, as at 21, to overlap the open end of the part 14, as clearly shown in said figure.

It will be obvious that the particular construction of the driving-wheel-gearing case and the pedal-shaft-gearing case may be modified without departure from my invention.

As a means for coupling the two side-shaft gears together, so that they may rotate in unison, and at the same time insure perfect working thereof, irrespective of any misalinement caused by the springing or bending of the slightly-elastic frame, I have provided a driving connection, or coupling, which, although rigid in itself, is capable of lateral and longitudinal movement with relation to said side-shaft gears. This driving connection or coupling, in the form thereof herein shown, consists of a rigid shaft preferably of tubular form, fluted or having peripheral longitudinal ribs or flanges 22 at opposite ends thereof, curved slightly in the direction of their length and having a sliding fit in sockets or in similar radial grooves 22', formed longitudinally in the interior of the two side-shaft gears $g'$ and $h'$, respectively. These longitudinally-curved ribs or flanges 22 constitute lateral engaging faces which coact with similar engaging faces in the two side-shaft gears $g'$ and $h'$ and, while they are fixed as against rotary movement with relation to said gears, they permit a lateral movement of the shaft with relation to said gears, to thereby cause the shaft to adjust itself to any misalinement thereof.

As a means for providing an end abutment for the side shaft, the two gears $g'$ and $h'$ are each shown having a plug or a relatively short shaft 25 in one end thereof against which the end of the side shaft may abut, said plugs or shafts also having conical faces at their ends and forming each one member of a ball-bearing which supports one end of the side-shaft gears $g'$ and $h'$, as will be understood by reference to Fig. 2 of the drawings.

In practice the side shaft S will be of slightly-less length than the distance between the two abutments 25 of the side-shaft gears $g'$ and $h'$, so as to permit a slight longitudinal play of said shaft to compensate for expansion or retraction.

By the construction and arrangement of driving connection hereinbefore described, it will be seen that the side shaft may be readily removed and disconnected from the side-shaft gears, and that all the adjustment of the intermeshing gears may be made independently of the side shaft, and that any slight variation in the length of the side shaft or any misalinement will, owing to the peculiar connection of the side shaft with the side-shaft gears, be automatically provided for.

In practice, should the framework of the machine be sprung so as to throw the two opposite gears $g'$ and $h'$ out of perfect alinement, the side shaft will readily adjust itself to such misalinement, thus enabling the machine to be run without injurious effects and without disassembling the readjusting parts thereof.

I claim—

1. In a bicycle of the class specified, in combination, a crank-shaft bracket and a driving-wheel bracket each having a longitudinally and a laterally disposed gear-receiving case, a side-frame tube extending between the said brackets and having a removable connection at one end with the laterally-disposed gear-receiving case of the crank-shaft bracket, and having a removable connection at its opposite end with the laterally-disposed gear-receiving case of the driving-wheel bracket, means for removably connecting the side-frame tube with said gear-receiving cases, a crank-shaft carried by the crank-shaft bracket and carrying a bevel-gear inclosed by the longitudinally-disposed gear-receiving case of said bracket, a driving-wheel carried by the driving-wheel bracket and carrying a bevel-gear inclosed by the longitudinally-disposed gear-receiving case of said bracket, two oppositely-disposed side gears mounted, one in fixed bearings in the laterally-disposed gear-receiving case of the crank-shaft bracket and meshing with the crank-shaft gear, and the other mounted in fixed bearings in the laterally disposed gear-receiving case of the driving-wheel bracket and meshing with the driving-wheel gear, and a rigid side shaft incased by the side-frame tube and having laterally and longitudinally-movable connection at its opposite ends with the two side gears, respectively.

2. In a bicycle, a crank-shaft bracket and a driving-wheel bracket each having a laterally-projecting open-ended gear-receiving case, in combination with a side-shaft-inclosing tube carrying open-ended caps at opposite ends thereof adapted for fitting the laterally-projecting cases of said brackets.

3. In a bicycle, the combination with the crank-shaft bracket and the driving-wheel bracket, each of which has an open-ended gear-receiving case, and with the side-shaft-inclosing tube carrying open-ended caps at opposite ends thereof removably fitted to the laterally-projecting cases of said brackets, of a crank-shaft inclosed by said crank-shaft bracket and having a gear, a driving-wheel carrying a gear inclosed by the casing of the driving-wheel bracket, two independent side-shaft gear-wheels inclosed by and having fixed bearings in the laterally-projecting cases of the two brackets, one in each case, and a side shaft inclosed by the side-shaft-inclosing tube and having laterally-movable connections at opposite ends with the two side-shaft gears.

4. In a bicycle, a crank-shaft-inclosing bracket comprising a tubular body portion having a crank-shaft-gear-receiving case at one end thereof, and having a laterally-projecting side-shaft-gear-receiving case at one side thereof, and caps removably secured to said gear-cases.

5. In a bicycle, in combination, the main bracket having the open flared end and cup-shaped lateral extension which form housings for the pedal-shaft gear and side-shaft gear, a cap removably secured to the flared end of said bracket, a cup-shaped cap removably fitted to the lateral extension of said bracket, a rear bracket and a side tube connecting the casing of the first-mentioned bracket with the last-mentioned bracket.

6. In a bicycle, a crank-shaft bracket comprising a tubular body portion having a laterally-disposed and a longitudinally-disposed gear-receiving case at one end thereof and opening one case into the other and provided, each case, with a removable cap, in combination with a crank-shaft having a bearing at one end in the cap of the longitudinally-disposed case, and at its opposite end in the tubular body portion thereof, and carrying a bevel-gear inclosed by said longitudinally-disposed case, a bevel-gear inclosed by and having fixed bearings in the laterally-disposed case, and adapted for movable connection with the side shaft.

7. In a bicycle, the combination with the pedal-shaft and its gear, and the driving-wheel and its gear, of a tubular bracket inclosing the pedal-shaft and pedal-shaft gear and having a lateral cup-shaped extension to form a casing for a side-shaft gear, a bracket adjacent to the driving-wheel and having a casing inclosing the driving-wheel gear and adapted to receive and inclose a side-shaft gear, a side tube having cup-shaped extensions at opposite ends in removable engagement with the side-shaft-gear casings, and two side-shaft gears supported one at each end of the side shaft in fixed bearings in the two casings, respectively, and connected with the side shaft so as to permit a lateral movement of said shaft relative to said gears.

8. In a bicycle, the combination of a relatively rigid crank-shaft bracket having a longitudinally-disposed and a laterally-disposed gear-case secured thereto, a relatively rigid driving-wheel bracket having a laterally-disposed gear-receiving case fixedly secured thereto, two relatively flexible side tubes one of which has an enlarged extension at each end thereof one extension being removably secured to the laterally-disposed case of the crank-shaft bracket and the other extension being removably secured to the laterally-disposed case of the driving-wheel bracket, a crank-shaft journaled in the crank-shaft bracket and carrying a gear-wheel inclosed by one of the cases of said bracket, a driving-wheel carried by the driving-wheel bracket and having a gear-wheel inclosed by the case of said bracket, two independent gears one of which meshes with the gear of said driving-wheel and has a fixed bearing in the driving-wheel-bracket case adapted to support the outer end of said gear and the other of which meshes with the crank-shaft gear and has a fixed bearing in the laterally-disposed case of the crank-shaft bracket adapted to support the outer end of said gear, adjustable bearings in the enlarged extensions of the side tube and adapted to support the inner ends of said respective gears, and a side shaft incased by said side tube and having laterally and longitudinally movable connections at its opposite ends with the two independent gears.

FRANCIS H. RICHARDS.

Witnesses:
FRED. J. DOLE,
JOHN L. EDWARDS, Jr.